United States Patent
Aizu et al.

(10) Patent No.: US 11,125,460 B2
(45) Date of Patent: Sep. 21, 2021

(54) CONTROL SYSTEM, SCENE CONTROL EXECUTION METHOD, AND RECORDING MEDIUM

(71) Applicant: PANASONIC INTELLECTUAL PROPERTY MANAGEMENT CO., LTD., Osaka (JP)

(72) Inventors: Kazuhiro Aizu, Osaka (JP); Jasmeen Julayhi, Osaka (JP); Minoru Satou, Hyogo (JP); Rikiya Masuda, Osaka (JP); Masami Ohno, Osaka (JP); Tomikazu Imai, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 16/607,065

(22) PCT Filed: Apr. 5, 2018

(86) PCT No.: PCT/JP2018/014510
§ 371 (c)(1),
(2) Date: Oct. 21, 2019

(87) PCT Pub. No.: WO2018/198701
PCT Pub. Date: Nov. 1, 2018

(65) Prior Publication Data
US 2020/0200421 A1    Jun. 25, 2020

(30) Foreign Application Priority Data
Apr. 24, 2017   (JP) .............................. JP2017-085360

(51) Int. Cl.
*F24F 11/52* (2018.01)
*G05B 15/02* (2006.01)
*E05F 15/71* (2015.01)

(52) U.S. Cl.
CPC .............. *F24F 11/52* (2018.01); *E05F 15/71* (2015.01); *G05B 15/02* (2013.01); *E05Y 2400/45* (2013.01); *E05Y 2900/146* (2013.01)

(58) Field of Classification Search
CPC . F24F 11/52; E05F 15/71; E05F 15/77; E05F 15/79; G05B 15/02; E05Y 2400/45;
(Continued)

(56) References Cited

U.S. PATENT DOCUMENTS 6,563,430 B1 *   5/2003   Kemink ................. H04B 1/202
                                                       340/12.22
9,179,057 B2 *   11/2015  Sako ....................... H04N 5/232
(Continued)

FOREIGN PATENT DOCUMENTS

CN    106547209 A    3/2017
JP    S60-080048 A   5/1985
(Continued)

OTHER PUBLICATIONS

International Search Report and Written Opinion dated Jun. 12, 2018 in International Application No. PCT/JP2018/014510; with partial English translatoin.
(Continued)

*Primary Examiner* — Ramesh B Patel
(74) *Attorney, Agent, or Firm* — McDermott Will & Emery LLP

(57) ABSTRACT

A device control system includes: a touch panel that receives an execution instruction for scene control that operates at least part of a plurality of devices disposed in a facility in order to approximate an inside of the facility to a predetermined indoor environment; a controller that performs the scene control when the execution instruction for the scene control is received by the touch panel; and a communicator and an obtainer that obtain at least one of information (Continued)

indicating an environment condition in the facility or outside the facility, prediction information of the environment condition in the facility or outside the facility, and information about timing. The controller changes a content of the scene control according to the information obtained by the communicator and the obtainer.

15 Claims, 8 Drawing Sheets

(58) Field of Classification Search
CPC .... E05Y 2900/146; G08C 17/02; H04Q 9/00; G06F 13/00
See application file for complete search history.

(56) References Cited

U.S. PATENT DOCUMENTS

| | | | |
|---|---|---|---|
| 10,146,194 B2* | 12/2018 | Todeschini | G02B 27/0172 |
| 2006/0154642 A1* | 7/2006 | Scannell, Jr. | F21V 33/00 |
| | | | 455/404.1 |
| 2007/0146160 A1* | 6/2007 | Takeshita | G08C 23/04 |
| | | | 340/13.24 |
| 2013/0060643 A1* | 3/2013 | Callahan | G06Q 30/02 |
| | | | 705/14.66 |
| 2015/0381903 A1* | 12/2015 | Morioka | H04N 5/772 |
| | | | 348/239 |
| 2016/0054017 A1 | 2/2016 | Takahashi | |
| 2016/0255410 A1* | 9/2016 | Itoh | H04N 21/25891 |
| | | | 725/14 |
| 2017/0108838 A1* | 4/2017 | Todeschini | H05B 47/125 |

FOREIGN PATENT DOCUMENTS

| | | |
|---|---|---|
| JP | 2002-173975 A | 6/2002 |
| JP | 2008-191757 A | 8/2008 |
| JP | 2011-081982 A | 4/2011 |
| JP | 2013-223381 A | 10/2013 |
| JP | 2014-110455 A | 6/2014 |
| JP | 2014-174762 A | 9/2014 |
| JP | 2015-125536 A | 7/2015 |
| JP | 2015-135226 A | 7/2015 |
| JP | 2016-184197 A | 10/2016 |
| JP | 2016-192611 A | 11/2016 |
| JP | 2016-196983 A | 11/2016 |
| JP | 2016-225681 A | 12/2016 |
| TW | 201126462 A | 8/2011 |
| TW | M416289 U | 11/2011 |
| WO | 2015/173931 A1 | 11/2015 |
| WO | 2016/181852 A1 | 11/2016 |

OTHER PUBLICATIONS

Extended European Search Report issued in European Patent Application No. 18790034.5, dated Feb. 13, 2020.

* cited by examiner

FIG. 11

| | AIR-CONDITIONER | | | ELECTRIC FAN |
|---|---|---|---|---|
| | ON/OFF | PRESET TEMPERATURE | OPERATION MODE | |
| 28°C OR MORE | ON | 28°C | AUTOMATIC | OFF |
| 23°C OR MORE AND LESS THAN 28°C | OFF | — | — | ON |
| 15°C OR MORE AND LESS THAN 23°C | OFF | — | — | OFF |
| LESS THAN 15°C | ON | 20°C | AUTOMATIC | OFF |

FIG. 12

| TIME | LIGHTING APPARATUS | | | ELECTRIC CURTAIN | ELECTRIC SHUTTER |
|---|---|---|---|---|---|
| | ON/OFF | ILLUMINANCE | OPERATION MODE | | |
| 7:00 - 18:00 | OFF | — | — | OPEN | OPEN |
| 18:00 - 7:00 | ON | 1000 lx | AUTOMATIC | CLOSED | CLOSED |

CONTROL SYSTEM, SCENE CONTROL EXECUTION METHOD, AND RECORDING MEDIUM

CROSS-REFERENCE OF RELATED APPLICATIONS

This application is the U.S. National Phase under 35 U.S.C. § 371 of International Patent Application No. PCT/JP2018/014510, filed on Apr. 5, 2018, which in turn claims the benefit of Japanese Application No. 2017-085360, filed on Apr. 24, 2017, the entire disclosures of which Applications are incorporated by reference herein.

TECHNICAL FIELD

The present invention relates to a control system, a scene control execution method, and a recording medium for performing scene control for approximating the inside of a facility to a predetermined indoor environment.

BACKGROUND ART

Conventionally, a control method for an air-conditioner has been proposed. PTL 1 discloses an air-conditioning controlling and adjusting device that changes the target temperature based on a report on thermal feeling by a user.

CITATION LIST

Patent Literature

PTL 1: Japanese Unexamined Patent Application Publication No. 2015-135226

SUMMARY OF THE INVENTION

Technical Problem

When controlling a device relevant to the formation of an indoor environment, such as an air-conditioner, even if there is no report from the user as described above, it is desirable that the device be controlled so that the indoor environment is adaptively prepared.

The present invention provides a control system, a scene control execution method of scene control, and a recording medium that can adaptively change the content of control of a device.

Solutions to Problems

A control system according to an aspect of the present invention includes: a receptor that receives an execution instruction for scene control that operates at least part of a plurality of devices disposed in a facility in order to approximate an inside of the facility to a predetermined indoor environment; a controller that performs the scene control when the execution instruction for the scene control is received by the receptor; and an obtainer that obtains at least one of information indicating an environment condition in the facility or outside the facility, prediction information of the environment condition in the facility or outside the facility, and information about timing, wherein the controller changes a content of the scene control according to the information obtained by the obtainer.

A scene control execution method according to an aspect of the present invention includes: receiving an execution instruction for scene control that operates at least part of a plurality of devices disposed in a facility in order to approximate an inside of the facility to a predetermined indoor environment; performing the scene control when the execution instruction for the scene control is received; and obtaining at least one of information indicating an environment condition in the facility or outside the facility, prediction information of the environment condition in the facility or outside the facility, and information about timing, wherein a content of the scene control is changed according to the information obtained.

A recording medium according to an aspect of the present invention is a non-transitory computer-readable recording medium having recorded thereon a program for causing a computer to execute the above-described scene control execution method.

Advantageous Effect of Invention

The present invention provides a control system, a scene control execution method of scene control, and a recording medium that can adaptively change the content of control of a device.

BRIEF DESCRIPTION OF DRAWINGS

FIG. 11 is a diagram for describing an example of changing an operational state of an air-conditioner in a scene control at the time of coming home.

FIG. 12 is a diagram for describing an example of changing an operational state of a lighting apparatus in a scene control at the time of coming home.

DESCRIPTION OF EXEMPLARY EMBODIMENTS

Hereinafter, embodiments will be described with reference to the drawings. It should be noted that each of the following embodiments shows a generic or specific example. The numerical values, shapes, materials, elements, the arrangement and connection of the elements, steps, the processing order of the steps, etc. shown in the following embodiments are mere examples, and thus are not intended to limit the present disclosure. Furthermore, among the elements described in the following embodiments, elements not recited in any one of the independent claims that indicate the broadest concepts are described as optional elements.

It should be noted that each of the figures is a schematic diagram and thus is not necessarily a precise illustration. Furthermore, in the figures, elements that are substantially the same are given the same numerical references, and overlapping description thereof may be omitted or simplified.

Embodiment

[Overall Configuration of Device Control System]

Figure 1:
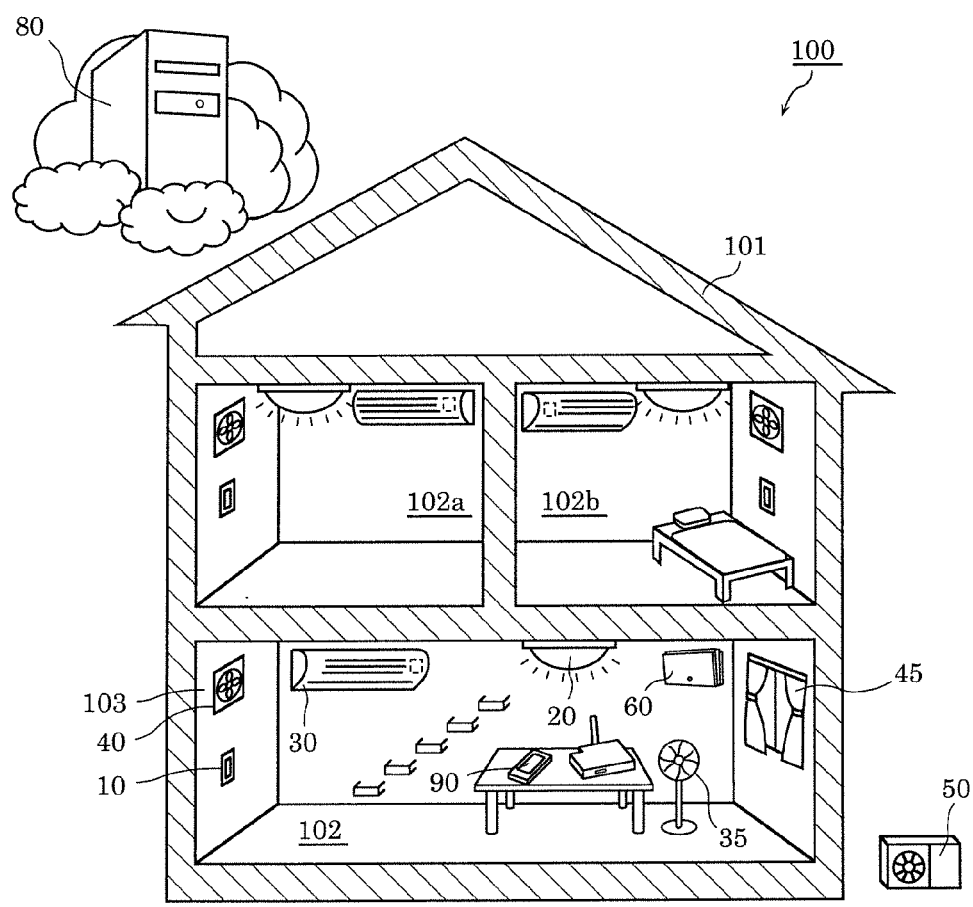
FIG. 1 is a diagram showing the outline of a device control system according to an embodiment.

First, the configuration of a device control system according to an embodiment will be described. FIG. 1 is a diagram showing the outline of the device control system according to the embodiment.

As shown in FIG. 1, device control system 100 is a system that is provided in facility 101, and that is for controlling a device disposed in facility 101. Facility 101 is, for example, a detached house. A plurality of rooms divided with walls, doors, etc. are included in facility 101. Specifically, the plurality of rooms are room 102, room 102a, and room 102b.

Figure 2:
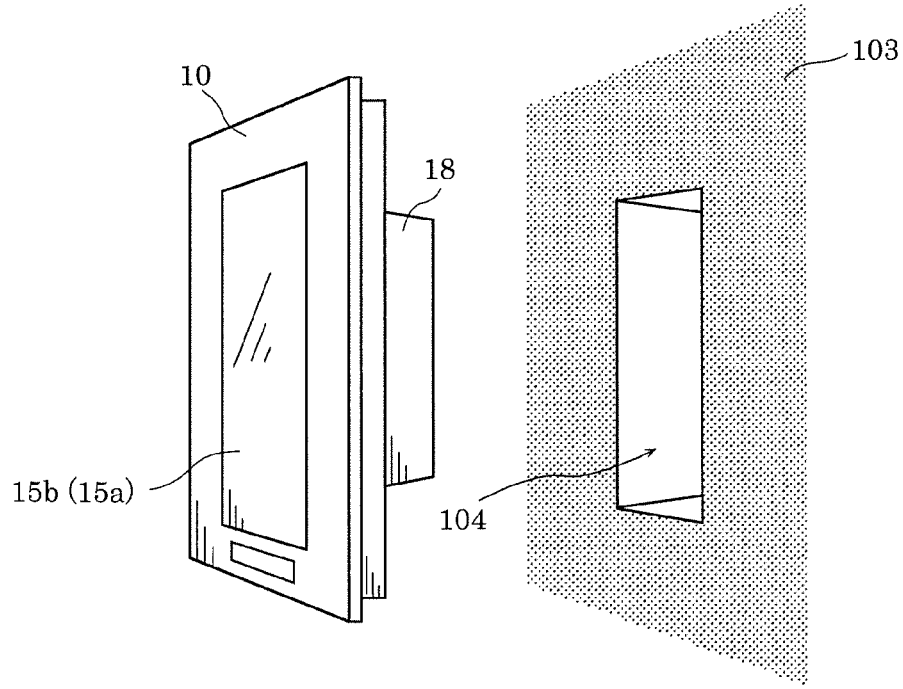
FIG. 2 is a perspective view of a control device according to the embodiment.
Figure 3:
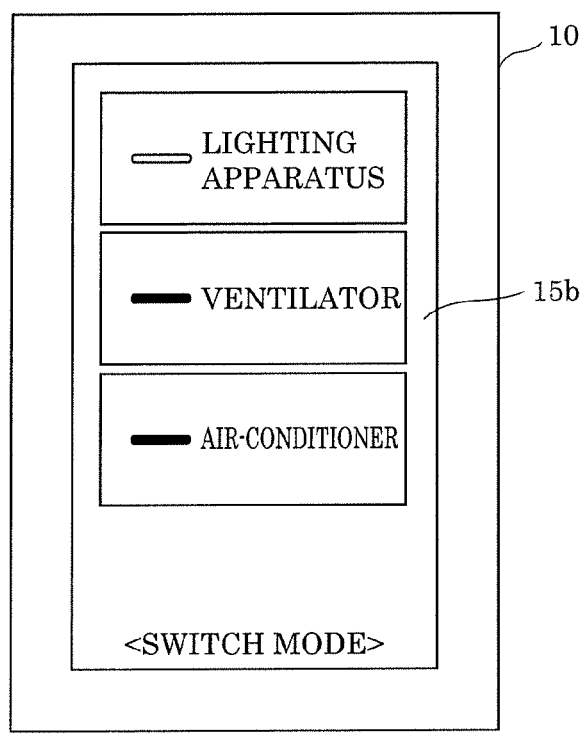
FIG. 3 is a front view of the control device according to the embodiment.

Control device 10 included in device control system 100 is a controller for the user to control a plurality of devices disposed in facility 101. The plurality of devices include lighting apparatus 20, air-conditioner 30, electric fan 35, ventilator 40, electric curtain 45, exterior unit 50, electric shutter 55 (not shown in FIG. 1), and so on. Control device 10 also functions as a so-called wall switch (wall switch apparatus). FIG. 2 is a perspective view of control device 10. FIG. 3 is a front view of control device 10.

As shown in FIG. 2, control device 10 is disposed on wall 103 of room 102. Wall 103 is an example of structures included in facility 101. Control device 10 is disposed on wall 103 in a state where at least a part of housing 18 is housed in switch box 104 embedded in wall 103. A mounting method of control device 10 is broadly similar to that of a general-purpose wall switch, and a switch box for a wall switch can also be used for switch box 104.

As shown in FIG. 3, control device 10 functions as a so-called GUI (Graphical User Interface), and images including, for example, icons (buttons) are displayed on display 15b of control device 10. The user can turn on and off the electric power supply to each device, i.e., lighting apparatus 20, air-conditioner 30, and ventilator 40 by performing a tap operation on the parts of the icons on display 15b (touch panel).

Figure 4:
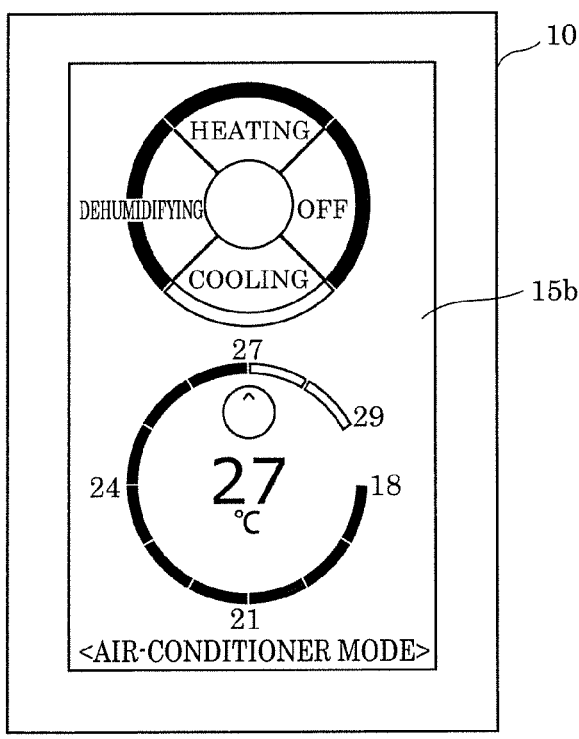
FIG. 4 is a diagram showing an example of an image for controlling an air-conditioner.

Further, an image for performing detailed control of each above-described device is also displayed on display 15b of control device 10. FIG. 4 is a diagram showing an example of the image for controlling air-conditioner 30. With the image shown in FIG. 4, it is possible for the user to perform changing of the operation mode and set temperature of air-conditioner 30. The changing of the operation mode and set temperature of air-conditioner 30 may be performed via respectively different images. Further, although not shown, an exclusive image for performing the dimming control and toning control, etc., of lighting apparatus 20, an exclusive image for controlling the intensity of ventilation of ventilator 40, an exclusive image for opening and closing electric curtain 45, etc., may be displayed on display 15b.

Only one of such image for controlling air-conditioner 30, image for controlling lighting apparatus 20, and image for controlling electric curtain 45, etc., is selectively displayed on display 15b, for example. For example, whenever the user performs a swipe operation on display 15b (touch panel), the image currently displayed is switched to another image.

Figure 5:
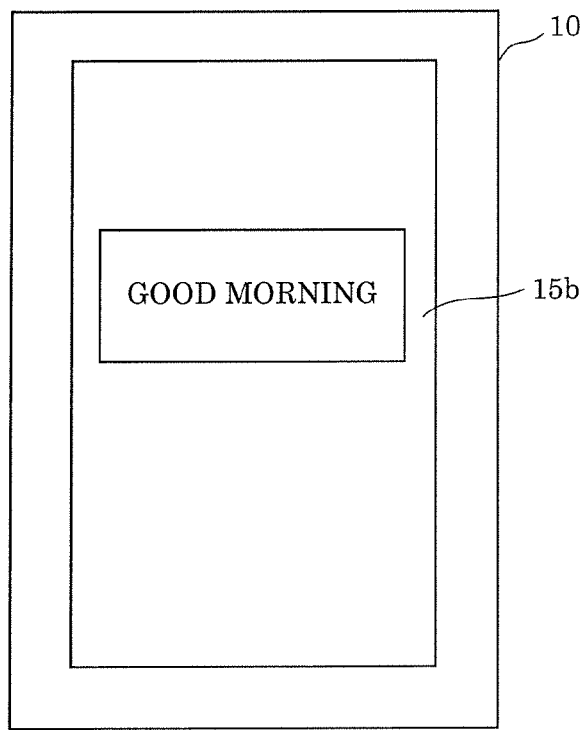
FIG. 5 is a diagram showing an example of an image for scene control.
Figure 6:
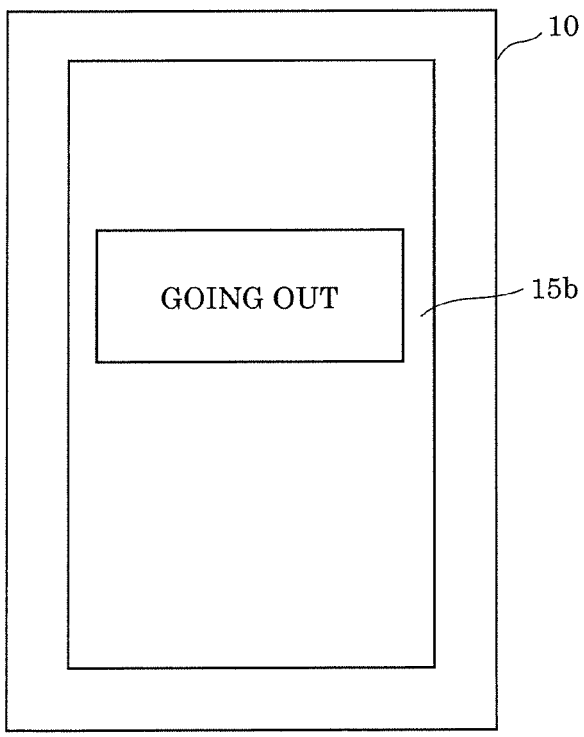
FIG. 6 is a diagram showing another example of an image for scene control.

Additionally, an image for scene control is also displayed on display 15b of control device 10. FIG. 5 and FIG. 6 are diagrams showing examples of the image for scene control.

The scene control is control that operates at least a part of a plurality of devices disposed in facility 101 (in room 102), in order to approximate the inside of facility 101 to a predetermined indoor environment. In the scene control, for example, a plurality of devices of different kinds or functions are collectively controlled. For example, as shown in FIG. 5, an image including an icon including the characters of "good morning" (hereinafter also described as a good morning icon) is an image for the scene control performed mainly when the user wakes up. When a tap operation is performed on the good morning icon, lighting apparatus 20 is turned on, electric curtain 45 and electric shutter 55 are opened, and air-conditioner 30 is turned on by transmitting a control signal by control device 10. That is, the control suitable for when the user wakes up is performed by one-touch.

Additionally, as shown in FIG. 6, an image including an icon including the characters of "going out" (hereinafter also described as an going out icon) is an image for the scene control performed mainly when the user goes out. When a tap operation is performed on the going out icon, lighting apparatus 20 is turned off, electric curtain 45 and electric shutter 55 are closed, and air-conditioner 30 is turned off by transmitting a control signal by control device 10. That is, the control suitable for when the user goes out is performed by one-touch.

Only one of such a plurality of images for scene control is selectively displayed on display 15b of control device 10. For example, whenever the user performs a swipe operation on display 15b (touch panel 15a), the image for scene control currently displayed is switched to another image for scene control. Note that, although the images shown in FIG. 5 and FIG. 6 include only one icon that is the target of operation, a plurality of icons that are the targets of operation may be included in one image. Further, the scene control may be performed immediately after a tap operation is performed on the icon, or may be performed after a predetermined period has passed since a tap operation is performed on the icon.

Further, screen transition may be performed according to an operation other than a swipe operation. For example, an icon for screen transition may be included in an image, and a screen transition may be performed by a tap operation on the icon for screen transition. Additionally, control device 10 may include a hardware key (button) for screen transition, and screen transition may be performed by an operation to the hardware key. That is, screen transition may be performed based on operation to control device 10.

[Detailed Configuration of Device Control System]

Figure 7:
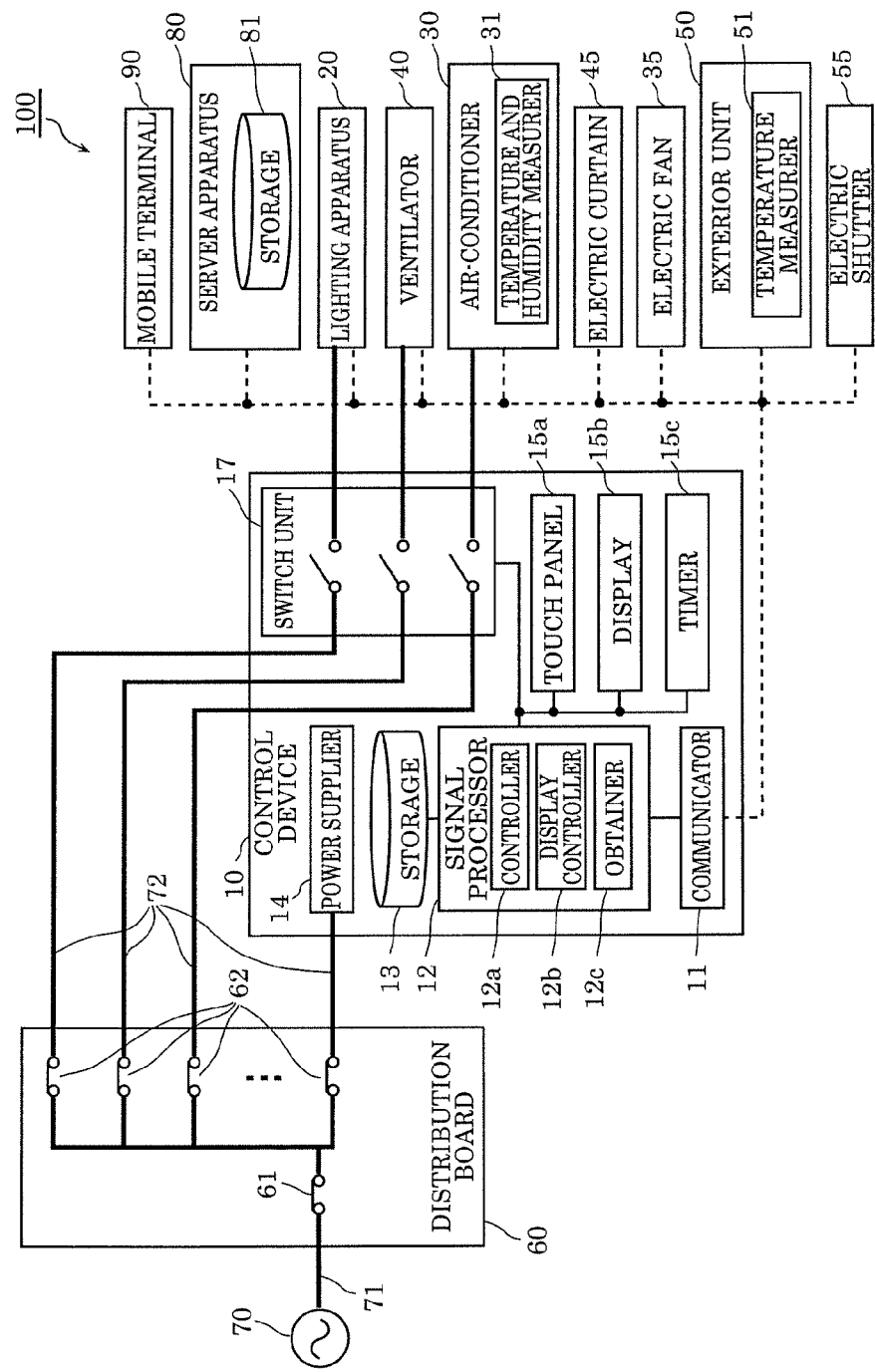
FIG. 7 is a block diagram showing a configuration of a device control system according to the embodiment.

Hereinafter, the detailed configuration of device control system 100 will be described. FIG. 7 is a block diagram showing the configuration of a device control system according to the embodiment.

Device control system 100 is an example of a display system. As shown in FIG. 7, specifically, device control system 100 includes control device 10, lighting apparatus 20, air-conditioner 30, electric fan 35, ventilator 40, electric curtain 45, exterior unit 50, distribution board 60, server apparatus 80, and mobile terminal 90. Additionally, electric power system 70, which is an external power supply, is also shown in FIG. 7. Hereinafter, referring mainly to FIG. 1 and FIG. 7, each component constituting device control system 100 will be described.

[Control Device]

As described above, control device 10 is a controller that is disposed in, for example, room 102, and that is for controlling the devices disposed in room 102 by the user. Specifically, control device 10 controls lighting apparatus 20, air-conditioner 30, electric fan 35, ventilator 40, electric curtain 45, exterior unit 50, and electric shutter 55. In other words, lighting apparatus 20, air-conditioner 30, electric fan 35, ventilator 40, electric curtain 45, exterior unit 50, and electric shutter 55 are examples of the control target device of control device 10.

Specifically, control device 10 includes communicator 11, signal processor 12, storage 13, power supplier 14, touch panel 15a, display 15b, timer 15c, and switch unit 17. Additionally, as shown in FIG. 2, control device 10 includes housing 18.

Communicator 11 performs wireless communication with devices disposed in facility 101. Specifically, communicator 11 wirelessly transmits a control signal to the control target device based on the control of controller 12a. Additionally, communicator 11 can also communicate with a device located outside facility 101, such as server apparatus 80 and mobile terminal 90 (shown in facility 101 in FIG. 1), via a wide area network such as the Internet. Communicator 11 receives, for example, a variety of information from server apparatus 80 or mobile terminal 90.

Communicator 11 is an example of an obtainer, and obtains, for example, the temperature information indicating the temperature measured by temperature and humidity measurer 31 included in air-conditioner 30, from air-conditioner 30. Additionally, communicator 11 obtains the humidity information indicating the humidity measured by temperature and humidity measurer 31 included in air-conditioner 30 from air-conditioner 30. Such temperature information and humidity information are examples of the information indicating the environment condition in facility 101. Further, communicator 11 may obtain the temperature information and the humidity information from an exclusive temperature and humidity measuring device, instead of temperature and humidity measurer 31 included in air-conditioner 30.

Additionally, communicator 11 obtains the outside-air-temperature information indicating the temperature measured by temperature measurer 51 included in exterior unit 50, from exterior unit 50. In addition, communicator 11 may obtain the humidity information of the outside of facility 101 from a humidity measuring device (not shown) disposed outside facility 101. Such outside-air-temperature information and the humidity information of the outside of facility 101 are examples of the information indicating the environment condition outside facility 101. Further, communicator 11 may obtain the outside-air-temperature information from an exclusive temperature measuring device, instead of temperature measurer 51 included in exterior unit 50. Communicator 11 may obtain the outside-air-temperature information and the humidity information of the outside of facility 101 from server apparatus 80 that manages the outside-air-temperature information and the humidity information of the area to which facility 101 belongs.

Specifically, communicator 11 is realized by a communication module (communication circuit). Communicator 11 is realized by, for example, a plurality of communication modules, such as a communication module for performing wireless communication with the device disposed in facility 101, and a communication module for performing communication with the device located outside facility 101.

Signal processor 12 performs signal processing relevant to control of the device. Signal processor 12 includes controller 12a, display controller 12b, and obtainer 12c. Specifically, signal processor 12 is realized by a processor, a microcomputer, or a dedicated circuit. The specific operation of signal processor 12 will be described later.

Controller 12a performs control of lighting apparatus 20, air-conditioner 30, electric fan 35, ventilator 40, electric curtain 45, exterior unit 50, and electric shutter 55 by causing communicator 11 to wirelessly transmit the control signal. That is, the expressions "control" and "perform control" include outputting a control signal, etc. Additionally, controller 12a controls switch unit 17 based on the operation to display 15b (touch panel 15a). That is, controller 12a controls turning on and off of electric power supply to lighting apparatus 20, air-conditioner 30, and ventilator 40.

Additionally, controller 12a performs the scene control, when an execution instruction for scene control is received by touch panel 15a. In addition, controller 12a changes the content of the scene control according to the information obtained by communicator 11 or obtainer 12c. Further, controller 12a is an example of an information outputter, and outputs the information for informing that the content of the scene control has been changed. The details of the operation for changing the content of the scene control will be described later.

Display controller 12b displays the above-described image for the scene control, etc. on display 15b. Specifically, display controller 12b displays the image on display 15b by generating a video signal, and outputting the generated video signal to display 15b.

Obtainer 12c obtains the current date and time measured by timer 15c as the information about the timing. The information about the timing includes at least one or more of the time, the date, the day of the week, and the season.

The information that is the origin of an image displayed on display 15b (information that is the origin of a video signal), a control program executed by signal processor 12, etc. are stored in storage 13. Specifically, storage 13 is realized by a semiconductor memory, etc.

Power supplier 14 includes a power receiver (for example, a terminal for power receiving) that receives AC power supplied from electric power system 70, and converts the AC power received by the power receiver into DC power suitable for the operation of control device 10, and supplies the DC power to each component included in control device 10. The AC power received by the power receiver is, for example, the AC power for an existing wall switch (power switch for the device disposed in facility 101). Specifically, power supplier 14 is a power supply circuit including an AC/DC converter, or a DC/DC converter.

Touch panel 15a is a detection device that detects an operation of the user to display 15b (touch panel 15a). Touch panel 15a may be a capacitive touch panel, or may be a touch panel of other systems, such as a resistive film system.

Touch panel 15a is an example of a receptor, and receives the execution instruction for the scene control. Specifically, touch panel 15a receives, as an execution instruction for the scene control, an operation by the user to the icon included in the images for scene control as shown in FIG. 5 and FIG. 6

Display 15b is a touch-panel display on which touch panel 15a is disposed. Display 15b displays an image for the scene control, etc. based on control by display controller 12b. The images displayed by display 15b are illustrated in the above-described FIG. 3 to FIG. 6. Specifically, display 15b is realized by a liquid crystal panel or an organic EL panel, etc.

Timer 15c is a timing apparatus that measures the present date and time (including the year, month, and day). Although timer 15c is specifically a real-time clock (RTC), etc., timer 15c may be any form.

Switch unit 17 turns on and off the electric power supply from electric power system 70 to each of lighting apparatus 20, air-conditioner 30, and ventilator 40 based on the operation to display 15b (touch panel 15a). In other words, switch unit 17 turns on and off the main power supply of lighting apparatus 20, air-conditioner 30, and ventilator 40. Specifically, switch unit 17 is controlled by controller 12a based on the operation to display 15b (touch panel 15a). Switch unit 17 includes three switch elements corresponding to lighting apparatus 20, air-conditioner 30, and ventilator 40 for direct control without performing wireless communication by controller 12a.

The switch elements are located on branch circuits 72 (on power lines) from electric power system 70 to each device, i.e., lighting apparatus 20, air-conditioner 30, and ventilator 40, and turn on and off the electric connection between electric power system 70 and each device. In other words, the switch elements switch whether or not to supply power to the device disposed in facility 101. The switch elements may be elements that structurally open and close electric contacts, such as relay elements, or may be semiconductor switching elements, such as power transistors. Note that switch unit 17 may include at least one switch element. That is, switch unit 17 may be able to directly turn on and off the electric power supply to at least one device.

Housing 18 (shown in FIG. 2) houses communicator 11, signal processor 12 (controller 12a, display controller 12b, and obtainer 12c), touch panel 15a, display 15b, timer 15c, and switch unit 17. Although housing 18 is formed of, for example, a resin, a part or all of housing 18 may be formed of a metal. As described above, at least a part of housing 18 is embedded in wall 103 of facility 101. Housing 18 may be directly attached to the wall of facility 101, or may be indirectly attached to the wall of facility 101 via an attaching member, etc. Housing 18 may be able to be attached to a structure, such as wall 103 of facility 101.

In the above, the configuration of control device 10 has been described. Note that the described configuration of control device 10 is an example. For example, control device 10 may be a controller that does not include the components (switch unit 17, etc.) for functioning as a wall switch.

[Lighting Apparatus]

Lighting apparatus 20 is an example of the device disposed in facility 101, and is specifically disposed in room 102. Lighting apparatus 20 is a so-called ceiling light that lights the inside of a room. Specific forms of lighting apparatus 20 may be, but not particularly limited to, a downlight, a pendant light, a spotlight, or a bracket light, etc.

Specifically, lighting apparatus 20 includes an LED (Light Emitting Diode) as a light source. Lighting apparatus 20 may include a semiconductor light-emitting element such as a fluorescence tube, and a semiconductor laser, or a solid light-emitting element such as an organic EL (Electro Luminescence), and an inorganic EL, as a light source.

Additionally, although not shown, lighting apparatus 20 includes a communication module (communication circuit) for performing wireless communication with control device 10, and receives the control signal transmitted by communicator 11 included in control device 10. That is, lighting apparatus 20 can emit light or turn off the light based on the control signal received from control device 10. For example, when the rate of dimming (dimming ratio) is specified in the control signal, lighting apparatus 20 emits light at the specified rate of dimming. Additionally, when the color temperature is specified in the control signal, lighting apparatus 20 emits light with the specified color temperature. Further, the turning on and off (lighting and turning off the lights) of the electric power supply from electric power system 70 to lighting apparatus 20 are controlled by switch unit 17.

[Air-Conditioner]

Air-conditioner 30 is an example of the device disposed in facility 101, and is specifically disposed in room 102. Air-conditioner 30 is a home use air-conditioner. Air-conditioner 30 is an air-conditioner that can adjust the temperature of the wind sent out from air-conditioner 30 by including a heat exchanger (not shown), etc. That is, air-conditioner 30 includes temperature adjusting functions (a blowing function, and cooling and heating functions). Air-conditioner 30 is not limited to the home use air-conditioner, and may be an industrial air-conditioner.

Air-conditioner 30 includes temperature and humidity measurer 31.

Temperature and humidity measurer 31 measures the temperature and humidity of room 102, and outputs the temperature information indicating the measured temperature (room temperature), and the humidity information indicating the measured humidity. Temperature and humidity measurer 31 includes a thermistor or a thermocouple as an element for measuring the temperature, and includes a polymer resistance humidity sensor, or a polymer capacitance humidity sensor as an element for measuring the humidity. Note that temperature and humidity measurer 31 separated from air-conditioner 30 may be used for measurement of the temperature and humidity in facility 101. Additionally, a temperature measurer separated from air-conditioner 30 and a humidity measurer separated from air-conditioner 30 may be used for measurement of the temperature and humidity in facility 101.

Additionally, although not shown, air-conditioner 30 includes a communication module (communication circuit) for performing wireless communication with control device 10, and receives the control signal transmitted by communicator 11 included in control device 10. That is, air-conditioner 30 can perform switching of operation mode, and changing of set temperature based on the control signal received from control device 10. Additionally, air-conditioner 30 transmits the temperature information and the humidity information that are output by temperature and humidity measurer 31 to communicator 11 included in control device 10. Turning on and off of the electric power supply from electric power system 70 to air-conditioner 30 are controlled by switch unit 17.

[Electric Fan]

Electric fan 35 is an example of the device disposed in facility 101, is disposed in room 102, and performs air blasting by rotation of a fan. Note that, unlike air-conditioner 30, electric fan 35 does not include an adjusting function of the temperature of wind to be sent out. That is, although electric fan 35 includes an air blasting function, electric fan 35 does not include temperature adjusting functions (a cooling function and a heating function).

Additionally, although not shown, electric fan 35 includes a communication module (communication circuit) for performing wireless communication with control device 10, and receives the control signal transmitted by communicator 11 included in control device 10. That is, electric fan 35 is operated based on the control signal received from control device 10.

[Ventilator]

Ventilator 40 is an example of the device disposed in facility 101, is disposed in room 102, and performs ventilation between room 102 (indoor) and the outside (outdoor) of facility 101. Ventilator 40 is a so-called ventilation fan, and exhausts the air in room 102 to the outside of facility 101 by rotation of a fan. Additionally, ventilator 40 can change the amount of exhaust air (air volume).

Further, unlike air-conditioner 30, ventilator 40 does not include an adjusting function of the temperature of the air exhausted to the outside of facility 101. That is, although ventilator 40 includes an air blasting function, ventilator 40 does not include temperature adjusting functions (a cooling function and a heating function).

Additionally, although not shown, ventilator 40 includes a communication module (communication circuit) for performing wireless communication with control device 10, and receives the control signal transmitted by communicator 11 included in control device 10. That is, ventilator 40 can change the air volume based on the control signal received from control device 10.

Turning on and off of the electric power supply from electric power system 70 to ventilator 40 are controlled by switch unit 17.

[Electric Curtain]

Electric curtain 45 is an example of the device disposed in facility 101, is disposed in room 102, and opens and closes a curtain. Although not shown, electric curtain 45 includes a communication module (communication circuit) for performing wireless communication with control device 10, and receives the control signal transmitted by communicator 11 included in control device 10. That is, electric curtain 45 opens and closes the curtain based on the control signal received from control device 10.

[Exterior Unit]

Exterior unit 50 is an exterior unit of air-conditioner 30. Exterior unit 50 includes temperature measurer 51. Temperature measurer 51 includes an element for measuring the temperature, such as a thermistor or a thermocouple, and measures the outside air temperature around facility 101. Additionally, although not shown, exterior unit 50 includes a communication module (communication circuit) for performing wireless communication with control device 10, and transmits the outside-air-temperature information indicating the outside air temperature measured by temperature measurer 51 to communicator 11 included in control device 10.

[Electric Shutter]

Electric shutter 55 is an example of the device disposed in facility 101, is disposed on the outer side of a window that facility 101 includes, and is opened and closed. Electric shutter 55 includes a communication module (communication circuit) for performing wireless communication with control device 10, and receives the control signal transmitted by communicator 11 included in control device 10. That is, electric shutter 55 is opened and closed based on the control signal received from control device 10. Note that, although electric shutter 55 is disposed, for example, on the outer side of the window to which electric curtain 45 is disposed, electric shutter 55 is not shown in FIG. 1. Electric shutter 55 may be disposed on the outer side of a window to which electric curtain 45 is not disposed.

[Distribution Board]

Distribution board 60 includes main breaker 61 for turning on or off the electric power supply from electric power system 70 through main line 71. Main breaker 61 is a breaker that stops supply of the electric power from electric power system 70, when a current exceeding a predetermined current (a current based on the electric power defined by a contract with an electric power company) flows from electric power system 70.

Additionally, distribution board 60 includes a plurality of branch breakers 62 corresponding to a plurality of branch circuits 72 branched from main line 71, respectively. That is, distribution board 60 includes branch breaker 62 for each of branch circuits 72. Branch breaker 62 is a breaker which, when an overcurrent flows into branch circuit 72 connected to branch breaker 62, stops the supply of electric power to branch circuit 72.

Further, distribution board 60 may include a power consumption measuring function, and a wireless communication function that transmits a measured power consumption. The power consumption measuring function in this case may be a function that measures only the power consumption in main line 71, or may be a function that measures both the power consumption in main line 71, and the power consumption for each of branch circuits 72. Additionally, device control system 100 may include a power consumption measuring apparatus separated from distribution board 60. The separated power consumption measuring apparatus may measure only the power consumption in main line 71, or may measure both the power consumption in main line 71 and the power consumption for each of branch circuits 72.

[Server Apparatus]

Server apparatus 80 is an apparatus that manages weather information.

The weather information includes weather forecast information. Specifically, the weather information includes the prediction information of the environment condition of the outside of facility 101, such as rainfall probability, the anticipated amount of PM2.5, and the anticipated amount of pollen. The weather information includes the information indicating the environment condition of the outside of facility 101, such as warning, such as gale warning, and earthquake information.

Server apparatus 80 includes storage 81 for managing (storing), for example, weather information. Storage 81 is realized by an HDD (Hard Disk Drive), or a semiconductor memory, etc.

Although not shown, server apparatus 80 includes a communication module (communication circuit) for communicating with control device 10, and transmits the weather information stored in storage 81 to communicator 11 included in control device 10.

Further, server apparatus 80 may be a server apparatus that constitutes a client/server system with control device 10.

[Mobile Terminal]

Mobile terminal 90 is an information communication terminal carried by the user, and, specifically, is a smart phone, a tablet terminal, or a wearable terminal. The wearable terminal includes a glasses type terminal, a bracelet type terminal, and a wristwatch type terminal, etc. Although not shown, mobile terminal 90 includes a communication module (communication circuit) for performing communication with control device 10 and server apparatus 80.

[Scene Control]

Figure 8:
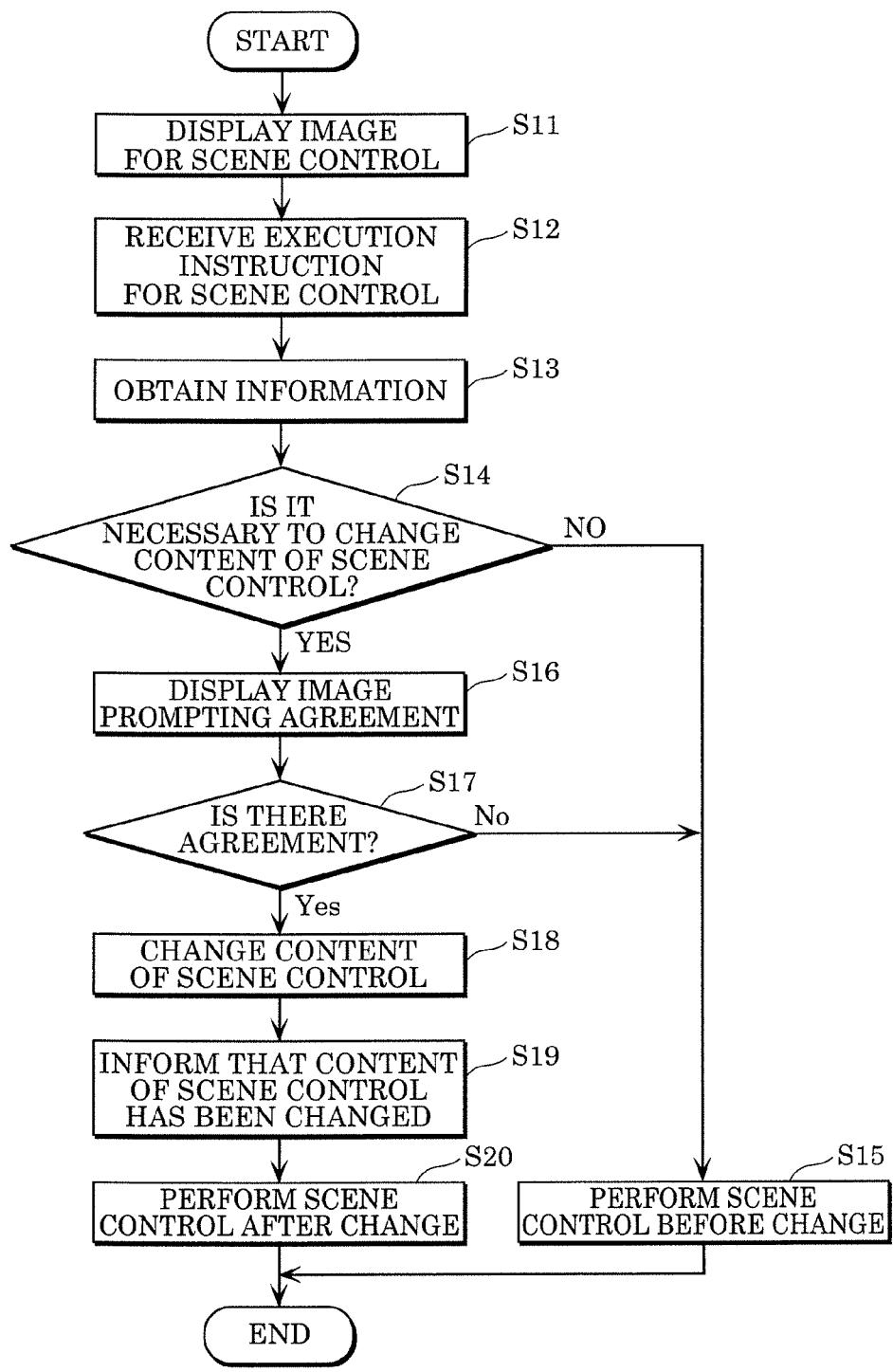
FIG. 8 is a flowchart of an operation of a scene control.

Next, the scene control performed by control device 10 will be described. FIG. 8 is a flowchart of the operation of the scene control.

Note that, as described above, the scene control is the control that operates at least a part of a plurality of devices disposed in facility 101, in order to approximate the inside of facility 101 (inside of room 102) to a predetermined indoor environment. The predetermined indoor environment includes, for example, the indoor brightness, the indoor temperature, etc. Hereinafter, although the scene control performed mainly at the time when the user comes home (hereinafter also described as the scene control at the time of coming home) is described as an example, a similar flow applies to the other scene control.

First, display controller 12b displays an image for receiving an execution instruction for the scene control at the time of coming home on display 15b (S11). As a result, the image for the scene control at the time of coming home in which the characters "good morning" in FIG. 5 has been replaced with the characters "welcome home" is displayed on display 15b.

Next, touch panel 15a receives an execution instruction for the scene control at the time of coming home (S12). Specifically, touch panel 15a receives an operation by the user to the icon included in the image for the scene control at the time of coming home (the icon including the characters "welcome home") as the execution instruction for the scene control at the time of coming home.

Here, in the scene control at the time of coming home (in the following description of FIG. 8, also described as the scene control at the time of coming home before the change), controller 12a turns on lighting apparatus 20, and turns on air-conditioner 30. Further, at this time, the illuminance of a surface illuminated with lighting apparatus 20 is, for example, 1000 lx, and air-conditioner 30 is set to be in an automatic operation mode, and the preset temperature is set to 28° C. Generally, the content of the scene control at the time of coming home is not changed, unless the user changes the setting. That is, the scene control at the time of coming home is uniformly performed. Meanwhile, in control device 10, the content of the scene control at the time of coming home is adaptively changed.

Specifically, controller 12a obtains information via communicator 11 or obtainer 12c (S13), and performs determination of whether or not to change the content of the scene control at the time of coming home, according to the obtained information (S14). The specific determination standard in step S14 will be described later. Further, the obtaining of the information is periodically performed. Accordingly, the determination in step S14 may be performed based on the information obtained before step S12.

When it is determined that it is unnecessary to change the content of the scene control at the time of coming home by controller 12a (No in S14), the content of the scene control at the time of coming home is not changed, and the scene control at the time of coming home before the change is performed (S15).

Figure 9:
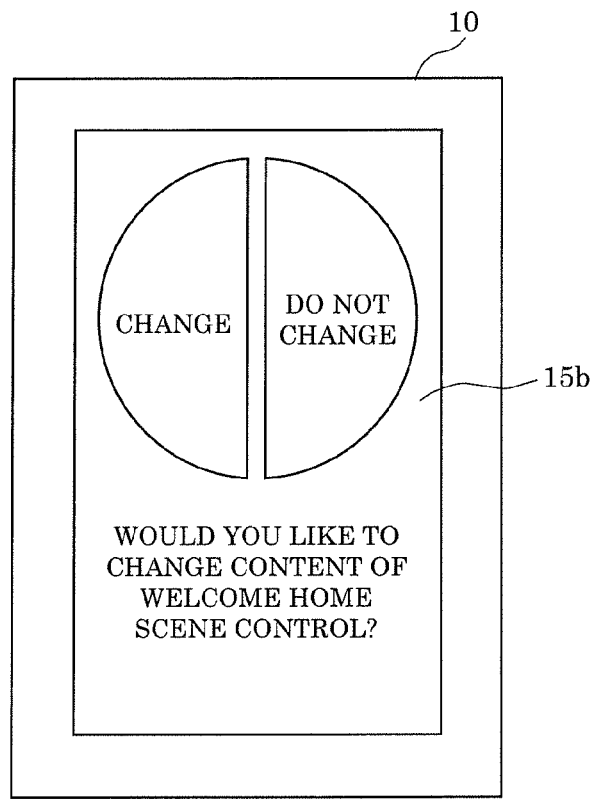
FIG. 9 is a diagram showing an example of an image prompting a user to agree with a change of a content of a scene control at the time of coming home.

When it is determined that it is necessary to change the content of the scene control at the time of coming home by controller 12a (Yes in S14), display controller 12b displays, on display 15b, an image prompting the user to agree with the change of the content of the scene control at the time of coming home as shown in FIG. 9 (S16). Controller 12a determines whether or not touch panel 15a has received an instruction indicating that the user has agreed with the change of the content of the scene control at the time of coming home (S17). FIG. 9 is a diagram showing an example of the image prompting the user to agree with the change of the content of the scene control at the time of coming home.

A case where an operation to the icon including the characters "change" is detected by touch panel 15a when the image as shown in FIG. 9 is displayed is, in other words, a case where the instruction indicating that the user agrees with the change of the content of the scene control at the time of coming home is received by touch panel 15a. In this case (Yes in S17), controller 12a changes the content of the scene control at the time of coming home (S18).

Figure 10:
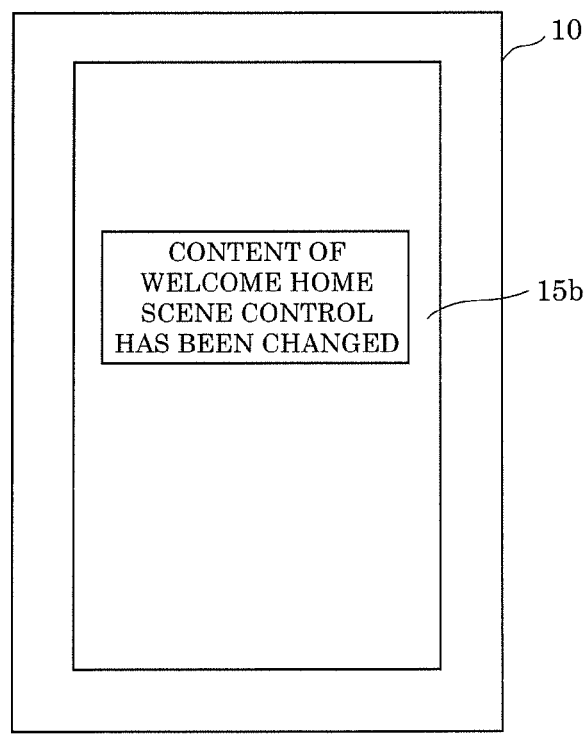
FIG. 10 is a diagram showing an example of an image for informing a user that a content of a scene control at the time of coming home has been changed.

Additionally, controller 12a outputs the information for informing that the content of the scene control at the time of coming home has been changed to display controller 12b, and display controller 12b informs the user that the content of the scene control at the time of coming home has been changed, by displaying an image on display 15b by using the information as a trigger (S19). FIG. 10 is a diagram showing an example of the image for informing the user that the content of the scene control at the time of coming home has been changed. Then, controller 12a performs the scene control at the time of coming home the content of which has been changed (also described as the scene control at the time of coming home after the change, in the following description of FIG. 8) (S20).

Further, in the above-described step S19, controller 12a may output the information for informing that the content of the scene control at the time of coming home has been changed to communicator 11, and communicator 11 may transmit the information to mobile terminal 90. Mobile terminal 90 that has received the information displays the image shown in FIG. 10 on a display included in mobile terminal 90. In this manner, the notification that the content of the scene control at the time of coming home has been changed may be performed not by control device 10 but by mobile terminal 90.

On the other hand, a case where an operation to the icon including the characters "do not change" is detected by touch panel 15a when the image as shown in FIG. 9 is displayed is, in other words, a case where the instruction indicating that the user does not agree with the change of the content of the scene control at the time of coming home is received by touch panel 15a. In this case (No in S17), the content of the scene control at the time of coming home is not changed, and the scene control at the time of coming home before the change is performed (S15).

In this manner, the content of the scene control at the time of coming home performed by control device 10 is adaptively changed. In other words, the content of the scene control performed based on the operation to the same icon is changed based on the information obtained by communicator 11 or obtainer 12c.

Note that each of the scene control at the time of coming home before the change and the scene control at the time of coming home after the change is the control for approximating the inside of facility 101 to a desired indoor environment (predetermined indoor environment) at the time when the user comes home, and changes the means for realizing the desired indoor environment. The change of the content of the scene control does not change the desired indoor environment itself.

Additionally, the order of steps in the flowchart of FIG. 8 is an example. For example, FIG. 8 shows the example of performing the determination of whether or not to perform the scene control at the time of coming home after changing the content of the scene control at the time of coming home, immediately before performing the scene control at the time of coming home. However, the determination of whether or not to change the content of the scene control at the time of coming home may be performed while performing the scene control at the time of coming home. That is, the content of the scene control at the time of coming home may be changed while performing the scene control at the time of coming home.

[Example 1 of Change of Content of Scene Control]

Next, Example 1 of change of the content of the above-described scene control at the time of coming home will be described. In Example 1 of change, an example of changing the operational state of air-conditioner 30 will be described. FIG. 11 is a diagram for describing the example of changing the operational state of air-conditioner 30.

Controller 12a changes the content of the scene control at the time of coming home according to the temperature information indicating the temperature in facility 101 obtained by communicator 11. Specifically, controller 12a changes the content of the scene control at the time of coming home by comparison between the temperature indicated by the obtained temperature information and a threshold value.

Further, the comparison between the temperature indicated by the obtained temperature information and the threshold value is performed as a part of determination processing in step S14 of FIG. 8. In step S14 of FIG. 8, whether or not it is necessary to perform the scene control at the time of coming home after changing the content of the scene control at the time of coming home performed last time is determined based on the comparison between the temperature indicated by the obtained temperature information and the threshold value.

For example, when the temperature indicated by the temperature information obtained by communicator 11 is equal to or more than 28° C., which is a first threshold value, controller 12a operates air-conditioner 30 in the automatic operation mode and with the preset temperature of 28° C. In this case, controller 12a stops the operation of electric fan 35. Accordingly, controller 12a approximates the temperature in facility 101 to a predetermined temperature.

Additionally, when the temperature indicated by the temperature information obtained by communicator 11 is less than 28° C., which is the first threshold value, and is equal to or more than 23° C., which is a second threshold value, controller 12a stops the operation of air-conditioner 30, and operates electric fan 35. When the temperature indicated by the temperature information obtained by communicator 11 is less than 23° C., which is the second threshold value, and is equal to or more than 15° C., which is a third threshold value, controller 12a stops the operation of air-conditioner 30, and stops the operation of electric fan 35. Accordingly, controller 12a approximates the temperature in facility 101 to the predetermined temperature.

When the temperature indicated by the temperature information obtained by communicator 11 is less than 23° C., which is the second threshold value, and is equal to or more than 15° C., which is the third threshold value, controller 12a stops the operation of air-conditioner 30, and stops the operation of electric fan 35. Accordingly, controller 12a approximates the temperature in facility 101 to the predetermined temperature.

When the temperature indicated by the temperature information obtained by communicator 11 is less than 15° C., which is the third threshold value, controller 12a operates air-conditioner 30 in the automatic operation mode and with the preset temperature of 20° C. In this case, controller 12a stops the operation of electric fan 35. Accordingly, controller 12a approximates the temperature in facility 101 to the predetermined temperature.

Next, a specific example will be described with continuing referring to FIG. 11. For example, suppose the scene control at the time of coming home before the change (for example, the scene control at the time of coming home performed last time) is the scene control at the time of coming home that is performed in the case of 28° C. or more in FIG. 11, and the scene control at the time of coming home after the change is the scene control at the time of coming home that is performed when the room temperature is 23° C. or more and less than 28° C. in FIG. 11. Then, in the scene control at the time of coming home after the change, electric fan 35 is operated, instead of air-conditioner 30 that is operated in the scene control at the time of coming home before the change. Here, air-conditioner 30 is an example of a first air-conditioner that includes the temperature adjusting function, and electric fan 35 is an example of a second air-conditioner that does not include the temperature adjusting function.

The power consumption of electric fan 35 in such scene control at the time of coming home after the change is lower than the power consumption of air-conditioner 30 in the scene control at the time of coming home before the change. Accordingly, the reduction of the power consumption in facility 101 is achieved.

As described above, controller 12a changes the operational state of air-conditioner 30 according to, for example, the temperature information indicating the temperature in facility 101 obtained by communicator 11. Additionally, controller 12a changes the device operated in the scene control at the time of coming home. Accordingly, appropriate air conditioning according to the temperature in facility 101, or the reduction of the power consumption is realized.

Note that, although the operational state of air-conditioner 30 is changed according to the temperature information indicating the temperature in facility 101 in FIG. 11, instead of the temperature information, the operational state of air-conditioner 30 may be changed according to the outside-air-temperature information indicating the temperature of the outside of facility 101 obtained by communicator 11. Additionally, the outside-air-temperature information may be used in addition to the temperature information.

For example, in the example of FIG. 11, when the temperature indicated by the temperature information is 23° C. or more and less than 28° C., air-conditioner 30 is turned off. However, even if the temperature indicated by the temperature information is 23° C. or more and less than 28° C., when the temperature indicated by the outside-air-temperature information is higher than the temperature indicated by the temperature information, air-conditioner 30 may be operated. That is, it is also conceivable that the operational state of air-conditioner 30 is changed by using the temperature information in conjunction with the outside-air-temperature information. Similarly, instead of the temperature information, or in addition to the temperature information, the humidity information indicating the humidity in facility 101 may be used, or the humidity information indicating the humidity of the outside of facility 101 may be used.

[Example 2 of Change of Content of Scene Control]

Next, Example 2 of change of the content of the above-described scene control at the time of coming home will be described. In Example 2 of change, an example of changing the operational state of lighting apparatus 20 will be described. FIG. 12 is a diagram for describing the example of changing the operational state of lighting apparatus 20.

Controller 12a changes the content of the scene control at the time of coming home according to the information about the timing (the current time measured by timer 15c) obtained by obtainer 12c. Specifically, controller 12a changes the content of the scene control at the time of coming home by comparison between the time indicated by the obtained information about the timing and a predetermined time period.

Note that the comparison between the time indicated by the obtained information about the timing and the predetermined time period is performed as a part of the determination processing in step S14 of FIG. 8. In step S14 of FIG. 8, for example, whether or not it is necessary to perform the scene control at the time of coming home after changing the content of the scene control that was performed last time at the time of coming home is determined based on the comparison between the time indicated by the obtained information about the timing and the predetermined time period.

For example, when the time indicated by the information about the timing obtained by obtainer 12c belongs to the time period of 7:00 to 18:00, which is a first predetermined time period, controller 12a stops the operation of (turns off) lighting apparatus 20. In this case, controller 12a introduces the outside light into facility 101 by opening electric curtain 45 and electric shutter 55. That is, controller 12a approximates the inside of facility 101 to a predetermined brightness by introducing the outside light, instead of turning on lighting apparatus 20, in the time period in which the outside of facility 101 is bright.

Additionally, when the time indicated by the information about the timing obtained by obtainer 12c belongs to the time period of 18:00 to 7:00, which is a second predetermined time period, controller 12a turns on lighting apparatus 20, and closes electric curtain 45 and electric shutter 55. Accordingly, the inside of facility 101 approximates the predetermined brightness.

For example, suppose the scene control at the time of coming home before the change is the scene control at the time of coming home in a case where the current time belongs to the second predetermined time period, and the scene control at the time of coming home after the change is the scene control at the time of coming home in a case where the current time belongs to the first predetermined time period. In this case, the brightness of lighting apparatus 20 in the scene control at the time of coming home after the change is darker than the brightness of lighting apparatus 20 in the scene control at the time of coming home before the change. Electric shutter 55 is in a closed state in the scene control at the time of coming home before the change, and is in an open state in the scene control at the time of coming home after the change.

The power consumption of lighting apparatus 20 in such scene control at the time of coming home after the change is lower than the power consumption of lighting apparatus 20 in the scene control at the time of coming home before the change. Accordingly, the reduction of the power consumption in facility 101 is achieved.

As described above, controller 12a changes the operational state of lighting apparatus 20 according to, for example, the information about the timing indicating the time obtained by obtainer 12c. Accordingly, appropriate lighting according to the time, or the reduction of power consumption, is achieved.

Note that, in FIG. 12, although the operational state of lighting apparatus 20 is changed according to the time, not only the time but also the month or the season may be taken into consideration. For example, the time period (the first predetermined time period) during which the outside light can be introduced is changed according to seasons (months). Accordingly, the determination standard (the lengths of the first predetermined time period and the second predetermined time period) of whether or not to change the content of the scene control at the time of coming home may be changed for each season or each month. For example, table information as shown in FIG. 12 provided for each season or each month may be stored in storage 13, and controller 12a may change the operational state of lighting apparatus 20 by referring to this table information. Further, the information of seasons or months may be included in the information about the timing.

Additionally, instead of the information about the timing, the brightness information indicating the brightness in facility 101 may be used for changing the operational state of lighting apparatus 20. The brightness information is obtained by communicator 11 from, for example, an illuminance sensor (not shown), etc. disposed in facility 101 (in room 102). Controller 12a changes the brightness of lighting apparatus 20 so that, for example, the brightness indicated by the brightness information approximates a predetermined brightness, which is the target in the scene control at the time of coming home.

[Example 3 of Change of Content of Scene Control]

Next, the change of the content of scene control, such as that in the above-described Example 1 of change and the above-described Example 2 of change, can also be applied to the scene control other than the scene control at the time of coming home. Additionally, the change of the content of the scene control may be performed based on the weather information obtained by communicator 11 from server apparatus 80. In Example 3 of change, an example will be explained in which the content of the scene control performed mainly at the time when the user gets up (hereinafter also described as the scene control at the time of getting up) is changed based on the information obtained from server apparatus 80.

In the scene control at the time of getting up, in order to introduce the morning sun into facility 101, controller 12a opens electric curtain 45 and electric shutter 55.

Here, when the weather information obtained by communicator 11 indicates at least one of (a) that the current rainfall probability is equal to or more than a predetermined probability (for example, 60%), (b) that the current anticipated amount of PM2.5 is equal to or more than a predetermined value, and (c) that gale warning has been issued, controller 12a changes the content of the scene control at the time of getting up, so as to close at least electric shutter 55. Accordingly, it is suppressed that the window gets wet, that PM2.5 enters facility 101, and that a window is broken by a strong wind, etc.

Additionally, in the scene control defined to operate ventilator 40, when the weather information obtained by communicator 11 indicates at least one of (a) that the current anticipated amount of PM2.5 is equal to or more than the predetermined value, and (b) that the anticipated amount of pollen is equal to or more than a predetermined value, controller 12a changes the content of scene control so as not to operate (so as to stop) ventilator 40. Accordingly, it is suppressed that PM2.5, pollen, etc. invade in facility 101 due to the operation of ventilator 40.

In this way, controller 12a detects an abnormality of the environment outside facility 101 based on the information indicating the environment condition outside facility 101 (for example, warning such as gale warning), or the prediction information of the environment condition outside facility 101 (for example, the rainfall probability, the anticipated amount of PM2.5, or the anticipated amount of pollen) obtained by communicator 11. When an abnormality is detected, controller 12a changes the operational state of the device in the scene control. Accordingly, adaptive scene control according to the circumstances outside facility 101 is achieved.

Further, in the scene control defined to operate ventilator 40, the content of the scene control may be changed so as to stop the operation of ventilator 40, according to VOC (Volatile Organic Compound) concentration information detected by a VOC concentration sensor (not shown) disposed in facility 101, or concentration information of PM2.5 detected by a PM2.5 sensor (not shown) disposed in facility 101. Similarly, in the scene control defined not to operate ventilator 40, the content of the scene control may be changed so as to stop the operation of ventilator 40, according to the VOC concentration information or the concentration information of PM2.5. The VOC concentration information and the concentration information of PM2.5 are examples of the information indicating the environment condition in facility 101.

Additionally, the change of the content of the scene control (the change of the operational state of the device) may be performed based on the detection result of a human detecting sensor disposed in facility 101. The detection result of the human detecting sensor is an example of the information indicating the environment condition in facility 101.

[Example 4 of Change of Content of Scene Control]

Although server apparatus 80 has been described as the server apparatus that manages the weather information in the above-described embodiment, server apparatus 80 may be a server that manages other information. For example, server apparatus 80 may be a server apparatus that manages schedule information of the user. For example, when the user operates mobile terminal 90, the schedule information is pre-registered in server apparatus 80 through an SNS (Social Networking Service) or an e-mail.

In this case, communicator 11 may obtain the schedule information of the user from server apparatus 80, and controller 12a may change the content of the scene control according to the schedule information obtained by communicator 11. Note that the schedule information may be obtained from mobile terminal 90, or may be directly input to control device 10 via touch panel 15a. In this case, touch panel 15a functions as the obtainer.

For example, in the scene control at the time of going to sleep, which is mainly used when the user goes to sleep, suppose it is determined to start turning on lighting apparatus 20 at a predetermined time of the next morning for waking up the user. In such a case, communicator 11 may change the time to start turning on lighting apparatus 20 according to a scheduled get-up time or a scheduled going-out time of the user defined in the obtained schedule information. Accordingly, adaptive scene control at the time of going to sleep according to the schedule information is achieved.

Further, in addition to the schedule information, the traffic jam information or the delay information of public transportation facilities may be used. In this case, communicator 11 obtains the traffic jam information or the delay information of public transportation facilities from, for example, another server apparatus that manages the traffic jam information or the delay information of public transportation facilities, which is different from server apparatus 80 that manages the schedule information.

For example, a case is conceivable in which the scheduled going-out time is defined in the received schedule information, and it is estimated that the user wakes up and goes out a little early due to the received traffic jam information or the delay information of a public transportation facility. In such a case, controller 12a may change the time to start tuning on lighting apparatus 20 to a first time, which is earlier than the above-described predetermined time. The first time is properly defined according to, for example, the scheduled going-out time defined in the schedule information, and the degree of traffic jam indicated by the traffic jam information, or the degree of delay indicated by the delay information of a public transportation facility.

Accordingly, adaptive scene control at the time of going to sleep according to the schedule information, and the traffic jam information or the delay information of the public transportation facility is achieved.

[Effects, Etc.]

As described above, device control system 100 includes: touch panel 15a that receives an execution instruction for scene control that operates at least part of a plurality of devices disposed in facility 101 in order to approximate an inside of facility 101 to a predetermined indoor environment; controller 12a that performs the scene control when the execution instruction for the scene control is received by touch panel 15a; and communicator 11 and obtainer 12c that obtains at least one of information indicating an environment condition in facility 101 or outside facility 101, prediction information of the environment condition in facility 101 or outside facility 101, and information about timing. Controller 12a changes a content of the scene control according to the information obtained by communicator 11 and obtainer 12c. Device control system 100 is an example of a control system; touch panel 15a is an example of a receptor, and communicator 11 is an example of an obtainer other than obtainer 12c.

Accordingly, device control system 100 can adaptively change the content of the scene control according to the information obtained by communicator 11 or obtainer 12c.

Furthermore, for example, in changing of the content of the scene control, controller 12a changes at least one of a device to be operated in the scene control, and an operational state of a device in the scene control.

Accordingly, device control system 100 can adaptively change at least one of the device operated in the scene control, and the operational state of the device in the scene control, according to the information obtained by communicator 11 or obtainer 12c.

Furthermore, for example, the plurality of devices include air-conditioner 30 that includes a temperature adjusting function, and electric fan 35 that does not include the temperature adjusting function. In the changing of the content of the scene control, controller 12a changes the device to be operated in the scene control according to the information indicating the environment condition in facility 101 or outside facility 101 obtained by communicator 11. In the scene control after the change, instead of air-conditioner 30 operated in the scene control before the change, electric fan 35 is operated. Air-conditioner 30 is an example of a first air-conditioner, and electric fan 35 is an example of a second air-conditioner.

Accordingly, device control system 100 can approximate the inside of facility 101 to the predetermined indoor environment requested by the scene control, by operating electric fan 35, instead of operating air-conditioner 30.

Furthermore, for example, the plurality of devices include lighting apparatus 20 and electric shutter 55 of facility 101. In the changing of the content of the scene control, controller 12a changes the operational state of the device in the scene control according to the information about the timing obtained by obtainer 12c. The brightness of lighting apparatus 20 in the scene control after the change is less than brightness of lighting apparatus 20 in the scene control before the change. Electric shutter 55 is in a closed state in the scene control before the change, and is in an open state in the scene control after the change.

Accordingly, device control system 100 can approximate the inside of facility 101 to the predetermined brightness requested by the scene control, by introducing the outside light, instead of making lighting apparatus 20 bright.

Furthermore, for example, in the changing of the content of the scene control, controller 12a detects an abnormality of the environment condition outside facility 101 according to the information indicating the environment condition outside facility 101, or the prediction information of the environment condition outside facility 101 obtained by communicator 11, and changes the operational state of the device in the scene control when the abnormality is detected.

Accordingly, device control system 100 can adaptively change the operational state of the device in the scene control according to whether or not an abnormality exists.

Furthermore, for example, each of the scene control before the change and the scene control after the change is control for approximating the inside of facility 101 to the predetermined indoor environment.

Accordingly, it is suppressed that the indoor environment becomes distant from the predetermined indoor environment due to the change of the content of the scene control.

Furthermore, for example, controller 12a operates two or more devices of different kinds among the plurality of devices in the scene control.

Accordingly, device control system 100 can achieve one scene control by operating two or more devices of different kinds.

Furthermore, for example, controller 12a changes the content of the scene control after touch panel 15a receives an instruction indicating that a user of device control system 100 agrees to the changing of the content of the scene control.

Accordingly, changing of the content of the scene control against the user's will is suppressed.

Furthermore, for example, controller 12a outputs information for informing that the content of the scene control has been changed. Controller 12a is an example of an information outputter.

Accordingly, device control system 100 can inform that the content of the scene control has been changed.

Furthermore, for example, the information about the timing includes at least one of time, date, day of week, and season.

Accordingly, device control system 100 can change the content of the scene control according to at least one of the time, the date, the day of the week, and the season.

Furthermore, for example, communicator 11 further obtains schedule information of a user of device control system 100, and controller 12a changes the content of the scene control according to the schedule information obtained by communicator 11.

Accordingly, device control system 100 can adaptively change the content of the scene control according to the schedule information.

Furthermore, for example, control device 10 is disposed in wall 103 included in facility 101, and further includes a power receiver that receives electric power supplied for a power switch of a device disposed in facility 101. Wall 103 is an example of a structure.

Accordingly, control device 10, which is operated by using the electric power supplied for a power switch, can adaptively change the content of the scene control according to the information obtained by communicator 11 or obtainer 12c.

Furthermore, for example, control device 10 further includes a switch element that switches between supplying and not supplying power to the device disposed in facility 101.

Accordingly, in the above-described display method, control device 10 functioning as a power switch can adaptively change the content of the scene control according to the information obtained by communicator 11 or obtainer 12c.

Furthermore, a scene control execution method includes: receiving an execution instruction for scene control that operates at least part of a plurality of devices disposed in facility 101 in order to approximate an inside of facility 101 to a predetermined indoor environment; performing the scene control when the execution instruction for the scene control is received; and obtaining at least one of information indicating an environment condition in facility 101 or outside facility 101, prediction information of the environment condition in facility 101 or outside facility 101, and information about timing. The content of the scene control is changed according to the information obtained. Such a scene control execution method is, for example, executed by a computer such as control device 10.

Furthermore, the present invention may be realized as a non-transitory computer-readable recording medium having recorded thereon a program for causing a computer to execute the above-described scene control execution method.

The computer that executes such a program can adaptively change the content of the scene control according to the information obtained by communicator 11 or obtainer 12c.

It should be noted that device control system 100 may be implemented as a single device or may be implemented as a plurality of devices. When device control system 100 is implemented as a plurality of devices, the elements included in device control system 100 described in the foregoing embodiments may be allocated as the plurality of devices in any manner.

For example, device control system 100 may be realized as a client/server system. For example, server apparatus 80 may obtain at least one of the information indicating the environment condition in facility 101 or outside facility 101, the prediction information of the environment condition in facility 101 or outside facility 101, and the information about the timing, and may perform the determination processing of whether or not to change the content of the scene control among the processes performed by controller 12a. Controller 12a may passively change the content of the scene control based on a signal indicating the result of the above-described determination processing transmitted from server apparatus 80.

Other Embodiments

In the above, although the embodiments have been described, the present invention is not limited to the above-described embodiments.

The communication method between the apparatuses described in the above-described embodiments is an example. The communication method between the apparatuses disposed in a facility is not particularly limited. Wireless communication using telecommunications standards, such as specific low power radio, ZigBee (registered trademark), Bluetooth (registered trademark), or Wi-Fi (registered trademark), is performed between apparatuses. Further, specifically, wireless communication is electric wave communication, or infrared ray communication.

Additionally, instead of wireless communication, wired communication, such as powerline communication (PLC) or communication using a cable LAN, may be performed between apparatuses disposed in a facility.

Furthermore, for example, in the foregoing embodiments, a process executed by a particular processing unit may be executed by another processing unit. Furthermore, the order of processes may be changed, or processes may be executed in parallel.

Furthermore, in the foregoing embodiments, each of the elements may be configured using dedicated hardware, or may be implemented by executing a software program suitable for the element. Each of the elements may be implemented by means of a program executer, such as a CPU or a processor, reading and executing the software program recorded on a recording medium such as a hard disk or a semiconductor memory.

Furthermore, each of the elements may be a circuit (or an integrated circuit). These circuits as a whole may compose a single circuit or may be individual circuits. Moreover, each of the structural components may be implemented by a general-purpose processor or a dedicated processor.

Furthermore, the general or specific aspects of the present invention may be implemented as a system, an apparatus, a method, an integrated circuit, a computer program, or a computer-readable recording medium such as a CD-ROM, or may be implemented as any combination of a system, an apparatus, a method, an integrated circuit, a computer program, and a recording medium. For example, the present invention may be implemented as the control device according to the foregoing embodiments.

Furthermore, in the foregoing embodiments, the order of processes in the operation of the device control system described in the foregoing embodiments is an example. The order of the processes may be changed, or processes may be executed in parallel.

Forms obtained by making various modifications to the above embodiments that can be conceived by those skilled in the art, as well as forms obtained by combining elements and functions in respective embodiments, without materially departing from the spirit of the present invention are included in the present invention.

REFERENCE MARKS IN THE DRAWINGS 11 communicator (obtainer)
12a controller
12c obtainer
15a touch panel (receptor)
20 lighting apparatus
30 air-conditioner (first air-conditioner)
35 electric fan (second air-conditioner)
55 electric shutter (shutter)
100 device control system (control system)
101 facility

The invention claimed is:

1. A control system, comprising:
a receptor that receives an execution instruction for collective control that collectively controls a plurality of devices disposed in a facility in order to approximate an inside of the facility to a predetermined indoor environment;
an obtainer that obtains at least one of information indicating an environment condition in the facility or outside the facility, prediction information of the environment condition in the facility or outside the facility, and information about timing; and
a controller, wherein,
when the receptor receives the execution instructions for the collective control, the controller determines whether to change a content of the collective control according to the information obtained by the obtainer,
when the controller determines not to change the content of the collective control, the controller performs the collective control, and
when the controller determines to change the content of the collective control, the controller changes the content of the collective control and performs the collective control the content of which has been changed.

2. The control system according to claim 1, wherein in changing of the content of the collective control, the controller changes at least one of a device to be operated in the collective control, and an operational state of a device in the collective control.

3. The control system according to claim 2, wherein the plurality of devices include a first air-conditioner that includes a temperature adjusting function, and a second air-conditioner that does not include the temperature adjusting function,
in the changing of the content of the collective control, the controller changes the device to be operated in the collective control according to the information indicating the environment condition in the facility or outside the facility obtained by the obtainer, and
in the collective control after the change, instead of the first air-conditioner operated in the collective control before the change, the second air-conditioner is operated.

4. The control system according to claim 2, wherein the plurality of devices include a lighting apparatus and a shutter of the facility, in the changing of the content of the collective control, the controller changes the operational state of the device in the collective control according to the information about the timing obtained by the obtainer,
brightness of the lighting apparatus in the collective control after the change is less than brightness of the lighting apparatus in the collective control before the change, and
the shutter is in a closed state in the collective control before the change, and is in an open state in the collective control after the change.

5. The control system according to claim 2, wherein in the changing of the content of the collective control, the controller detects an abnormality of the environment condition outside the facility according to the information indicating the environment condition outside the facility, or the prediction information of the environment condition outside the facility obtained by the obtainer, and changes the operational state of the device in the collective control when the abnormality is detected.

6. The control system according to claim 1, wherein each of the collective control before the change and the collective control after the change is control for approximating the inside of the facility to the predetermined indoor environment.

7. The control system according to claim 1, wherein the controller operates two or more devices of different kinds among the plurality of devices in the collective control.

8. The control system according to claim 1, wherein the controller changes the content of the collective control after the receptor receives an instruction indicating that a user of the control system agrees to the changing of the content of the collective control.

9. The control system according to claim 1, further comprising:
an information outputter that outputs information for informing that the content of the collective control has been changed.

10. The control system according to claim 1, wherein the information about the timing includes at least one of time, date, day of week, and season.

11. The control system according to claim 1, wherein
the obtainer further obtains schedule information of a user of the control system, and
the controller changes the content of the collective control according to the schedule information obtained by the obtainer.

12. The control system according to claim 1, wherein
the control system is realized as a control device disposed in a structure included in the facility, and
the control device further includes a power receiver that receives electric power supplied for a power switch of a device disposed in the facility.

13. The control system according to claim 12, wherein the control device further includes a switch element that switches between supplying and not supplying power to the device disposed in the facility.

14. A collective control execution method, comprising:
receiving an execution instruction for collective control that collectively controls a plurality of devices disposed in a facility in order to approximate an inside of the facility to a predetermined indoor environment;
obtaining at least one of information indicating an environment condition in the facility or outside the facility, prediction information of the environment condition in the facility or outside the facility, and information about timing; and
determining whether to change a content of the collective control when the execution instructions for the collective control is received, the determining being performed according to the information obtained;
performing the collective control when it is determined not to change the content of the collective control; and
when it is determined to change the content of the collective control, changing the content of the collective control and performing the collective control the content of which has been changed.

15. A non-transitory computer-readable recording medium having recorded thereon a program for causing a computer to execute the collective control execution method according to claim 14.

* * * * *